Aug. 16, 1966  R. F. PLAMBECK  3,267,300
FLAME SUPERVISORY SYSTEM
Filed Sept. 30, 1963  2 Sheets-Sheet 1
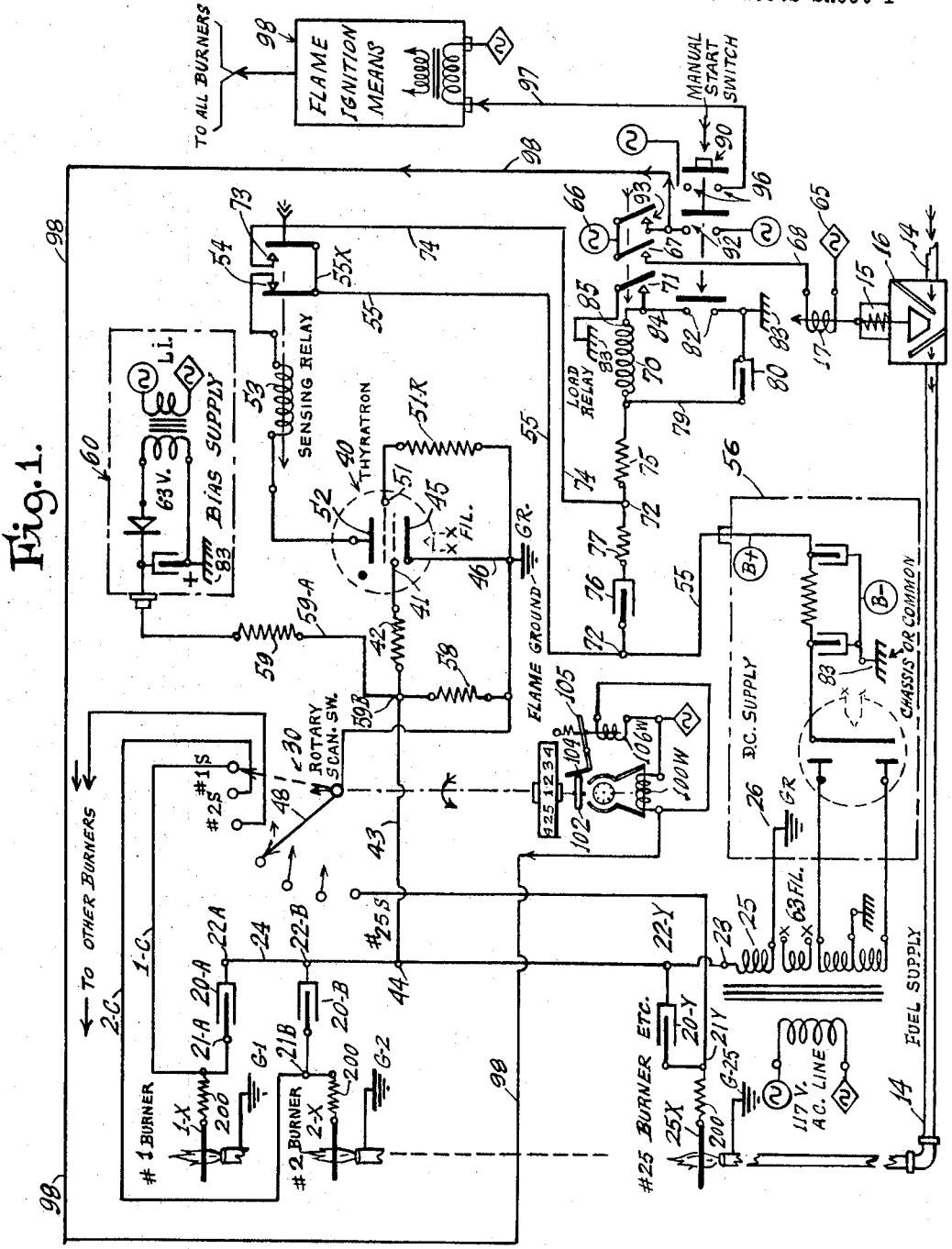
Fig. 1.
INVENTOR.
RONALD F. PLAMBECK
BY 
ATTORNEY.

Aug. 16, 1966   R. F. PLAMBECK   3,267,300
FLAME SUPERVISORY SYSTEM
Filed Sept. 30, 1963   2 Sheets-Sheet 2
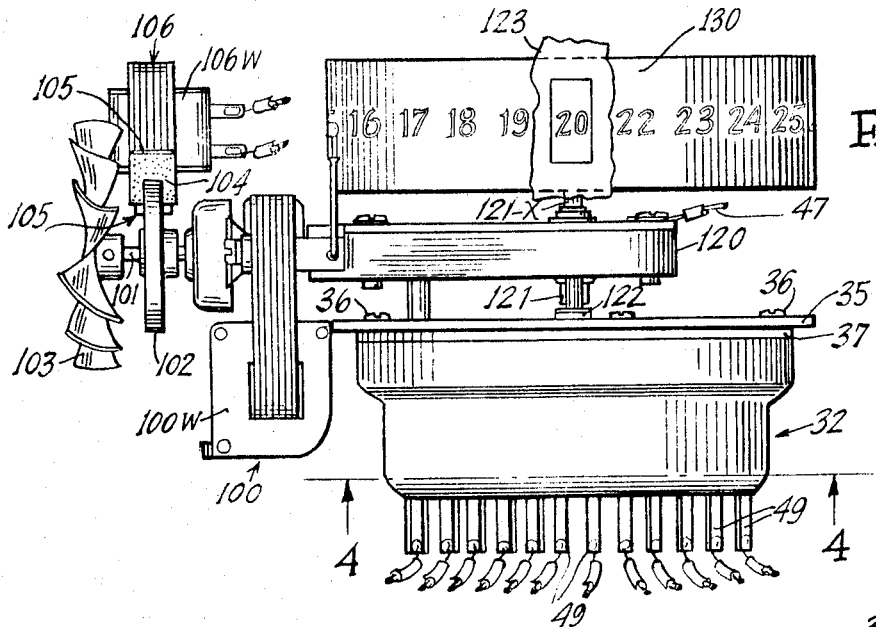
Fig.2.
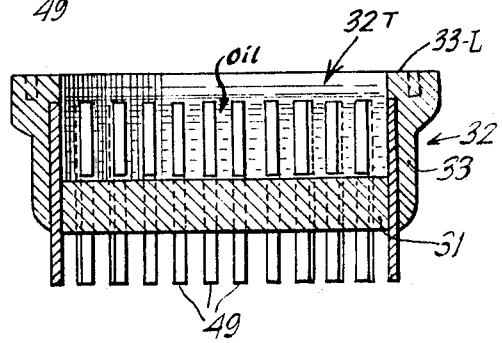
Fig.3.
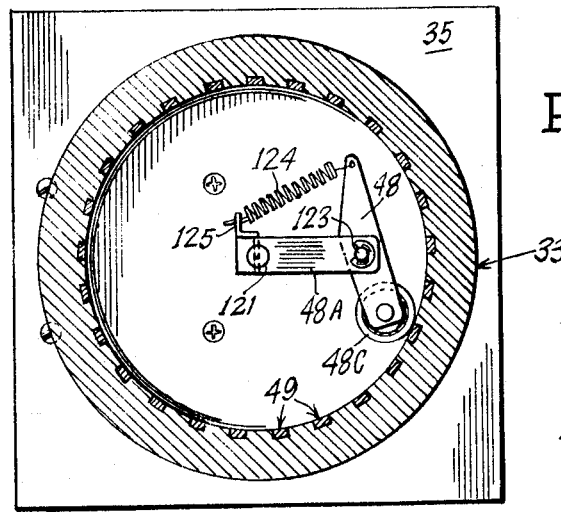
Fig.4.
INVENTOR.
RONALD F. PLAMBECK
BY
ATTORNEY.

United States Patent Office 3,267,300
Patented August 16, 1966

3,267,300
FLAME SUPERVISORY SYSTEM
Ronald F. Plambeck, Chicago, Ill., assignor to Protection Controls, Inc., Skokie, Ill., a corporation of Illinois
Filed Sept. 30, 1963, Ser. No. 312,680
10 Claims. (Cl. 307—117)

The invention pertains to supervisory and safety control circuits for use with equipment and systems involving a plurality of possible sources of operational failure which require immediate alarm, identification, and remedial measures such as prompt shutdown of the system, as, for example, in an installation of fuel burners in industrial heat-treating or processing ovens, dryers, furnaces, and the like, the broad objective of the improvements being the provision of a reliable, simplified and relatively inexpensive monitoring and signalling system for use with multiple-burner heating systems supplied with a fuel such as gas, which is to be controlled by a master valve adapted to be shut off instantly as a safety measure upon failure of any burner. While the disclosed improvements are illustrated in connection with fuel burners, as the application primarily intended, it will become evident hereafter that failure signals from any multiple source, other than fuel burners, may be utilized to actuate the novel monitoring system, as will more fully appear.

In general, the novel monitoring system stores a monitoring signal by means of charges on individually-assigned monitoring capacitors which are each scanned regularly in rapid succession by a cyclic scanning-switch means which enables each of the stored signals individually to actuate a signal control device in rapid succession at a time-division rate which assures a safe guard interval for the monitoring of each burner, whereby to maintain a supervisory master control circuit in a condition of a sustained operation in order, for example, to keep a master fuel valve or the like in an open condition so long as the monitored equipment continues in proper operation, the failure of the scanning switch means in any scanning cycle to sense a suitable charge on any one of the monitoring capacitors causing an operation of the supervisory master control circuit to effect the necessary safety control function, as in the illustrative embodiment, the shutting of the Master Fuel Valve, and the identification of the failed burner.

Many flame supervisory systems have been proposed in a continuing effort to increase or assure such factors as sensitivity, stability, reliability and the margin of fail-safe operation, and to simplify the equipment so as to minimize component failure and reduce initial and maintenance costs, the apparatus disclosed contributing improvements in each of these categories.

A common practice in the operation of combustion safeguard systems of the general class described, is to allow a predetermined time interval, generally known as the "drop-out" time, between the first sensing of an irregularity in flame behavior, and the final alarm and shut-down of the system, in order to provide a guard interval sufficient to determine whether a genuine failure has occurred, and to provide time to shut the system down with an adequate margin of safety.

Insurance underwriters currently accept a minimum of two seconds and a maximum of four seconds as the limits for such a "drop-out" interval, and most supervisory and monitoring equipment is designed to include some timing means (usually involving some form of capacitative network or R:C circuitry in conjunction with a master control or load relay) to provide such a drop-out interval during which the system may operate either to shut down finally or continue in operation, depending upon whether or not the condition signalling a supposed flame failure persists for the four-second maximum interval. Many examples of this kind of timing arrangement are to be found in the art, as for example in U.S. Patents 2,798,213 (Rowell); 2,455,350 (Beam); 2,431,158 (Yates); 2,360,532 (Yates); and many others.

While the presently-disclosed system operates in a way to afford the usual drop-out guard interval, this is achieved by means of providing a separate monitoring circuit for each individual burner, rather than at the load or sensing relay as in prior systems, and timing the connection and disconnection thereof with a single supervisory control device such as an electron tube or like electron flow control device. A scanning monitor switch tests each burner station in sequential scanning cycles timed to assure that each burner will always be guarded through the required drop-out interval defined by each complete scanning cycle, which will be a time function of the rate of scanning connection, and the total number of scanning connections to be completed per cycle.

More detailed objects and aspects of novelty and utility, inherent in the disclosures, will become apparent as the following description of the illustrative embodiment proceeds in view of the annexed drawings in which:

FIG. 1 is a circuit diagram and pictorial schematic of one form of the system;
FIG. 2 is a side elevation of the motor scanning unit;
FIG. 3 is a cross-sectional detail of the scanning contact chamber;
FIG. 4 is a horizontal sectional detail through the contact chamber with the rotary contactor shown in elevation, as viewed along lines 4—4 of FIG. 2.

With reference to the circuit of FIG. 1, the system is applied to a plurality of flame burners, for example twenty-five, designated "#1 Burner . . . #25 Burner," which may be the usual gas-fired burners in industrial heat-treating or processing furnaces, ovens, and the like, said burners being supplied with fuel via a supply duct 14 under control of an electro-mechanical master valve 16 of known type ordinarily spring-loaded for normal closure, and adapted to be held open against its spring 15 by electromagnetic solenoid or like means 17, so that fuel is supplied to the burners only so long as the master valve is held open by energization of said solenoid or equivalent electrically-controlled means 17.

It is one of the essential purposes of the disclosed flame supervisory system to maintain an operating circuit which keeps the master valve open so long as proper flames appear and continue at each of the several burners, and to effect a closure of this valve within a predetermined short guard interval having a duration of two seconds at the minimum and four seconds at the maximum following detection of the absence or insufficiency of any flame.

Means for sensing the presence or absence of a flame at each burner, in the embodiment illustrated, comprises a known type of flame rod 1–X, 2–X . . . 25–X disposed at each burner in position to lie within the flame and form one electrode in a flame-closed gap in an electrical detecting circuit utilized as a part of the flame-supervisory circuit, the base of each burner constituting the other electrode in the gap and having a conductive earth ground connection G–1, G–2 . . . G–25 as a common "ground" return.

Each flame rod is connected, as by corresponding conductors 1–C, 2–C . . . 25–C, to a corresponding scanning contact #1–S, #2–S . . . #25–S in a bank of such monitoring contacts comprising part of a special scanning switch 30, described more fully hereafter.

Additionally, each flame rod is also connected to one terminal 21 of a corresponding monitor capacitor 20–A, 20–B . . . 20–Y associated with each burner unit, the remaining terminals 22–A, 22–B . . . 22–Y of these capacitors being respectively connected to a common power supply conductor 24 connecting at 23 with one terminal of a high-voltage transformer winding 25, the remaining terminal of which is connected as at 26 to the common flame-rod return or ground, said transformer winding thus applying across each flame-completed gap and its series-connected monitoring capacitor an alternating potential of about 350 volts.

The high-voltage A.C. potential applied to each flame rod as aforesaid will produce a sufficiently rectified unidirectional voltage across the corresponding monitoring capacitor to charge the same, owing to the rectifying action of the flame across the gap between the burner head and flame rod, provided that a suitable quality of flame is maintained, the resultant capacitor charges being utilized as the monitoring signal for the appertaining burners, as will more fully appear hereafter.

Means for sensing and utilizing the condition of charge of the several flame rod monitoring and signal-storage capacitors comprises an electron flow device such as a Thyratron tube 40 having a control component or grid 41 connected through an isolating resistor 42 and conductor 43 to junction 44 with the common high-voltage flame supply conductor 24; said device further having a cathode component or electrode 45 connecting via conductors 46 and 47 to the movable or rotary contactor 48 of the scanning switch 30.

In the case of a device, such as the Thyratron illustrated, having a space-charge or screen grid 51, such screen grid will be returned to the cathode through a limiting resistance 51–R of about 1000 ohms to assure that the control grid does not tend to operate in the negative range.

The electron control device includes a further component such as the plate 52 having the functions of an anode which is connected through the winding 53 of a relay (designated for convenience as the "Sensing Relay") and contacts 54 normally closed by said relay, to a source of positive D.C. potential provided via conductor 55 from any suitable source such as a rectifier unit 56.

Where a space-charge device such as the Thyratron shown (for example a type "2D21" tube) is employed as the electron control device, the control element or grid 41 is preferably biased to cut-off by a negative voltage of around 6 to 10 volts D.C. which may be provided by any suitable means such as the small rectifying unit 60 applying such voltage to the grid via isolating resistor 59 (about 680 ohms), conductor 59–A to junction 59–B with conductor 43 commoned to the monitoring capacitors 20–A ... 20–Y. These capacitors may have a capacitance of about .1 mfd. each.

Since the anode of the illustrative control device is supplied with direct current from rectifier means 56, and its control electrode or grid 41 is normally biased negative to cut-off by the source 60, the tube tends to remain stable in non-conductive condition with no current flowing in the winding 53 of the sensing relay until such time as the device is triggered or fired by application of a suitable positive potential derived from one of the monitoring capacitors (e.g. 10 to 12 volts in the example given) to swing the grid element 41 positive.

Such triggering or firing of the control device 40 occurs each time the wiper contact 48 of the rotary scanning switch 30 passes over any of the scanning contacts 1–S ... 25–S which is rendered positive by the charge on the appertaining flame rod capacitor 20–A ... 20–Y.

Since the normal operation of the system contemplates that all of the monitored burners should be properly functioning with suitable flames at each station to keep the corresponding monitoring capacitors adequately charged, the electron flow device 40 will be actuated or fired, and quenched or restored, in rapid sequence as the scanning wiper passes over the successive scanning contacts, in each scanning cycle, the relay 53 being actuated twenty-five times per revolution of the scanning wiper, continually, while the system is in monitoring operation; and for such purposes it is desirable to employ a highly reliable type of relay capable of long life under conditions of repeated and rapid operation, such for example as one of the so-called mercury type relays employing a vibrating reed and mercury-wetted contacts, a variety of which is commercially available.

When the alternating voltage applied to the flame rods is in the stated order of 350 volts for the usual type of flame and the monitoring capacitors 20–A ... 20–Y have a value of about .1 mfd., an adequate firing voltage of as high as 100 volts will be produced when such capacitor is discharged across a grid-input shunt resistor 58, having a resistance of about 47K ohms, such voltage being safely more than sufficient to fire the control tube and energize the sensing relay winding 53 thereby causing this relay to open its contacts 54 and disconnect the anode voltage supply from source 56, as a result of which the tube becomes non-conductive again almost instantly, to be promptly fired by the next scanning signal, and so-on, repeatedly until such time as a flame failure may prevent any of the monitoring capacitors from recharging within the critical time interval established, in which case the sensing relay would fail to pull in, with the supervisory results presently to be described.

The time function of the scanning means depends upon the speed of rotation of the rotary scanning or monitoring contact wiper 48 and the capacity of each individual monitoring capacitor 20–A ... 20–Y, etc. for a given average condition of flame voltage and flame conductivity at each burner; and the invention thus affords a means for guarding the system through the desired drop-out interval in respect to each burner, which means will be independent of the sensing circuit and conditions at other burners, and yet capable of accurately controlling the responses of the single electron controlling device 40 and its associated sensing relay 53, and the dropping of the Master or Load Relay 70 thereby, particular aspects of these advantages and the selection of the speed of rotation of the scanning wiper being further described hereafter.

As previously mentioned, the Master Fuel Valve 16 in the fuel line tends to be normally closed by its spring 15, but is held open by the solenoid 17, preferably energized from the alternating current supply at A.C. terminals 65 and 66 via load relay contacts 67 closed and conductor 68.

The Load Relay Winding 70 is thus maintained in an energized condition to hold the valve open by its own holding circuit at Load Relay Contacts 71, closed, which serves to connect one terminal of this winding to the common return or ground for the —B— or D.C. plate voltage supply 56, the remaining terminal of this winding being connected to the positive —B— or D.C. plate supply conductor 55 by a jumper 55X at the Sensing Relay contacts, such that when the contacts 73 of the latter relay are closed, the D.C. voltage is applied via conductor 74 and protective resistor 75 (about 300 ohms) to the said remaining terminal of the Load Relay Winding, to energize the latter and charge a hold-in means such as the capacitor 80 shunted across said winding, which prevents the Load Relay from chattering and dropping out during the short intervals of transit of the scanning wiper from one contact bar to the next.

When Sensing Relay contacts 73 are opened responsive to the energization of this relay, the energizing circuit for the Load Relay is effectively disabled because said contacts 73, when closed, effect a discharging shunt around a blocking capacitor 76 of about .03 mfd. in series with a discharging resistor 77 (about 275 ohms) connecting the D.C. voltage on conductor 55 at junction 72 to the resistor 75 in series with the Load Winding coil; and such discharging shunt has the effect of connecting the D.C. energizing voltage directly around the blocking capacitor to the relay winding via resistor 75; but when said Sensing Relay Contacts 73 are opened on pulling in of the latter relay, the blocking capacitor 76 is thereby thrown in series with the Load Relay coil and the resulting current flow is insufficient to pull in the Load Relay, which, however, will not at once drop out on this account, but will hold-in for the brief interval while the scanning wiper is moving onto the next succeeding scanning contact bar.

Unlike prior supervisory circuits, the capacity of the shunt hold-in capacitor 80 in relation to the resistance of the Load Relay coil in the disclosed circuit is not calculated to provide the usual "drop-out" time delay, this function being performed by the time-division cycling of the scanning switch 30 in such manner that each burner is tested every two seconds (the minimum) and can not remain in failed condition for more than four seconds (the maximum); and if the scanning switch fails to detect a charged capacitor capable of firing the control device or tube in any two-second transit of the scanning switch, the Load Relay will drop out promptly before the scanning switch wiper moves on to the next contact.

The monitoring system must be set into operation manually in the first instance and following any failure, this being effected by means of a starting switch 90, which may also be utilized as the ignition switch for those burner systems which have the usual spark ignition means, indicated in the present circuit by the block diagram 98, and which is adapted to be actuated by closure of starting switch contacts 96 via conductor 97, concurrently with initiation of the monitoring operation by this same starting switch, the latter function being effected by closure of start contacts 82 to connect the common negative terminal of the anode or D.C. plate supply voltage at ground 83 via conductor 84 to junction 85 with the Load Relay winding until the latter relay can pull in and close its own holding circuit at its contacts 71 as previously explained.

Simultaneously with the starting energization of the Load Relay as aforesaid, the scanning-switch and position-indicator motor 100 will be energized via conductor 98 by start switch contacts 92, and when the Load Relay pulls in, the power circuit for the motor will be held at contacts 93 until such time as the Load Relay is caused to drop out.

Most burner systems include a supervisory lamp and/or individual tell-tale lamps for each burner (not shown) located at a control panel and serving to indicate to the attendant when all burners are ignited (or when any burner has failed), so that the attendant can release the starting switch button —B— when all flames are ignited, either by the automatic ignition means or flame in the case of torch-lighted burners, and the monitoring system takes over the supervisory function.

Because of the continuous-duty operation required, the scanning switch 30 is of special construction such as shown in FIGS. 2 to 4, wherein the array of monitor contacts consists of a plurality of elongated metallic contact bars 49 arranged in a circle and embedded in the floor 31 of a chamber or well 32 and portions of an upstanding annular sidewall 33 thereof defining a sump in which is contained a quantity of non-conductive lubricant liquid 34, such as a transformer oil or the like.

The housing or well 32 may be molded from a suitable synthetic plastic with side portions of the contact bars barely exposed in the inner peripheral surface of the annular wall and finally dressed by a grinding tool to a smooth and flush rounded conformity with said inner peripheral surface for transient engagement by a rotating contact means to be described.

The upper end 32–T of the well is initially open and provided with a closure in the form of an insulating plate 35 of suitable phenolic resin, or the like, secured by means of screws 36 tapped into the wide upper ledge 33–L bordering the well, a suitable gasket means 37 being interposed between the ledge and plate to seal against leakage of the oil content.

Mounted on the outside face of plate 35 is a small reduction gear unit 120 enclosed in a housing to which is attached a small self-starting induction motor 100 having a drive shaft 101 extended outwardly of the motor and equipped exteriorly with a brake drum 102 and a fan wheel 103.

Any suitable automatic braking means may be employed for the motor, the form in the illustrative embodiment comprising the brake disc 102 formed of a synthetic of the class of nylon, and a brake facing 104 of cork carried on a pivoted brake arm 105 (FIG. 1 also) and normally spring-urged to ride against the periphery of the brake disc. An electromagnetic means such as a solenoid 106 having a winding 106–W in parallel circuit with the motor winding 100–W, in accordance with FIG. 1, attracts the brake arm 105 to withdraw the brake facing from the brake disc while the motor is energized. When the Motor Circuit is interrupted, as by dropping out of the Load Relay, the brake actuator or solenoid is instantly deenergized and the brake facing spring-pressed back against the brake disc to stop the motor drive shaft instantly. A motor brake means such as shown in U.S. Patent No. 2,960,190 (Holper) may be employed.

The reduction gear means is conventional and includes a metal output shaft 121 driven at a relatively slow speed of 30 revolutions per minute, said shaft projecting upwardly from suitable metallic bearing means in the metallic gear housing and also projecting downwardly through sealing bushing 122 in the top plate into the well or sump, where it has affixed thereto a radial scanning rotor arm 48–A.

Pivoted as at 123 on the end of the rotor arm is the scanning contact means in the form of a rocker arm 48 having a rotatable contactor 48–C, which may be in the form of a small ball bearing, adapted to be thrust against and ride on the inner periphery of the well and over the exposed flush faces of the several contact bars 49. At the end of the rocker opposite the contactor is attached one end of a spring 124, the opposite end of which is anchored on the rotor 48–A, as by means of a small bracket 125, whereby the rolling contact element 48–C is constantly yieldingly pressed against the contact faces of the bars 49 as the motor shaft rotates. Electrical connection for the Scanning Signal Conductor 47 to this rotor contact means or wiper is adequately effected through the metals of the shaft 121 and the gear housing; the individual contact bars being respectively connected to corresponding monitoring capacitors 20–A, etc., as explained in view of FIG. 1.

Means affording a visual designation of the particular burner which has failed and caused an operation of the supervisory or monitoring circuit means to shut off the Master Fuel Valve, comprises the provision of a light-weight drum dial 130 (FIG. 2) fast on the upper projection 121–X of the motor output shaft to rotate in step with the scanning rotor, the periphery of this drum having delineated thereon a series of identifying numbers, for example 1 through 25, each positioned angularly to correspond to the position of the rotary wiper contact 48, 48–C on the correspondingly numbered one of the scanning contact bars 49, in such manner that whenever the rotor is stopped within the angular range of a single one of said scanning contacts, for instance the contact corresponding to a Burner No. 20, as in FIG. 2, the dial means will likewise display the corresponding number "20" before an index position such as the window 123, so that the attendant will be apprised of the identity of the particular burner causing the shut down.

For use in those flame systems governed by the standard two-to-four second "drop-out" interval, the scanning rotor will travel at the rate of 30 revolutions per minute or one revolution in two seconds, and thus will effect one complete scanning revolution covering all contacts (25 in this instance) in one revolution or two seconds, with a transient contacting time of slightly over $1/12$ second per scanning contact. Two complete scans will be completed in four seconds, so that should any flame be on the point of failing at the exact instant the scanning wiper happens to be departing from the appertaining contact, the said contact will be tested again within two seconds on the ensuing scanning cycle, the first scanning cycle which just missed detecting the incipient failure on the first two-second cycle nevertheless being able to detect this failure on the second cycle so that the failure will be detected at the maximum within the time of two scanning revolutions or four seconds.

The Load Relay is guarded against premature drop-out and chattering during the approximately ½ second transient scanning intervals from contact to contact in the array by the holding charge stored in the shunt capacitor 80, but neither the latter capacitor nor the monitoring capacitors determine the drop-out time, because such function is contrived to be effected by the time-division operation of the scanning switch means.

In respect to the sensitivity of the flame-responsive aspects of the disclosed circuit, it may be observed that while the flame rods employed in most industrial burner installations can be expected to produce relatively high flame currents of the order of 40 to 50 microamperes, the disclosed supervisory circuit comprising the several monitoring capacitors and associated electron-flow control device can respond reliably to flame currents as low as one microampere by reason of the signal storage operation which can occur during the travel of the scanning contactor, which affords sufficient time to accumulate a definite, as distinguished from a possibly spurious, low-energy signal charge on each capacitor, adequate to fire the control tube even though such charge may be considerably less than that which would be afforded by the higher order of flame currents in the 40 to 50 microampere range mentioned, in consequence of which the sensitivity of the system, owing to the time-division charging of the monitoring capacitors, is sufficient to eliminate any need for amplification of the flame or failure-detection signal.

The high sensitivity of the flame detecting system requires the provision in most modern burner installations of a limiting resistor 200 (about 100,000 ohms) to cut down the very high rectification currents which the more efficient burners are capable of yielding, whereby to protect the tube and keep the signal voltages at an optimum level and also to guard against short circuit across the flame rod.

In general, starting the count from any monitor or scanning contact, the time –T– for one complete scan back to the same contact will be two seconds, the minimum allowed for the required guard interval; and the scanning contactor will return to the same contact again in not more than 2T or four seconds, the maximum for the guard interval, according to currently approved insurance practices relating to the time in which an alarm or failure condition must be detected and the fuel supply shut off.

While fewer or more than 25 monitoring contacts may be guarded by the disclosed method and equipment (with corresponding changes in scanning rates), it is more feasible from an installation, equipment-standards, safety, and servicing viewpoint to utilize two or more scanning switch and detecting units in installations having in excess of 25 burners.

I claim:

1. The method of monitoring a plurality of burners in a predetermined maximum-minimum guard interval by use of a single signal-charge operated detecting device where each burner has a flame-rod source of signal-charge current, which method comprises: storing signal-charge current from each said source in a capacitor; employing a rotary scanning switch having a plurality of monitor contacts each connecting with one of said capacitors, and a rotatable scanning contactor engageable with each monitor contact once in each revolution thereof; rotating said scanning contactor at a predetermined scanning rate to establish electrical connections in a signal circuit between each monitor contact and said detecting device in each scanning cycle such that the detecting device will be actuated by a predetermined minimum signal charge existing on any capacitor connected by scanning action of the rotatable contactor, but will not be actuated by any signal charge thus connected which is less than said minimum charge; actuating a first relay means under control of said detecting device responsive to each actuation of the latter; controlling actuation of a second relay means to an alarm condition by said first relay means responsive to each operation of the latter; delaying actuation of the second relay means to alarm condition for a short interval equal to the transit time of said scanning contactor from one monitor contact to the immediately succeeding monitor contact; and correlating the speed of scanning rotation of the rotatable contactor in engagement with each monitor contact to connect the appertaining capacitor to the detecting device as aforesaid, such that each capacitor will be connected with the detecting device once during an interval not less than the time T seconds, as a minimum, and twice during a maximum interval of 2T, whereby the occurrence of failure of presence of the minimum signal charge on any capacitor at a time closely proximate to the departure of the scanning contactor from any monitor contact will be detected during the immediately succeeding transit of the rotatable contactor in a time not greater than 2T, the times T and 2T defining the limits of a predetermined guard interval during which a flame failure must be detected; said second relay means being connected to control a fuel supply for said burners.

2. A method according to claim 1 wherein the time T is substantially two seconds, and said scanning contactor is driven by a motor kept running under control of the second relay means and adapted to be stopped by the latter in said alarm condition thereof.

3. In a continuously-operable monitoring system for use with a plurality of sources of storable electrical monitoring signal charges, the lack of which is to be detected within a fixed guard interval having predetermined minimum and maximum time limits, in combination: a signal-operated supervisory detecting device; a plurality of signal-charge storing devices each connected to receive signal charge from one of said sources; a continuously operable scanning switch acting in cycles of predetermined identical duration to establish a test connection between each individual storing device and said supervisory device at a scanning rate which allocates substantially equal time-division test intervals to all said sources within said guard interval during each cycle; said predetermined cycle duration and scanning rate being correlated to the number of storing devices such that the aggregate of said time-division intervals in each cycle will equal said minimum time limit, and the interval between any two successive scanning tests for any said storing device will not exceed said maximum time limit.

4. A monitoring system for flame burners equipped with flame rod circuits adapted to produce a rectified current so long as a flame of predetermined size and quality is maintained, said system comprising a plurality of monitoring capacitors each connected in a circuit to be charged by current supplied by a particular one of said flame rod circuits; an electron control device having a control element operable by application thereto of a predetermined control charge from any of said capacitors to be thereby actuated from a first to a second condition and normally maintained in said first condition in the absence of such control charge; and a monitoring switch means operative in scanning cycles to interconnect said control element sequentially with each monitoring capacitor once during each scanning cycle whereby to actuate the electron control device and change its condition of operation from said first condition to the second condition, provided the predetermined control charge is present on the appertaining monitoring capacitor at the time the latter is so-connected by the scanning switch means; absence of the control charge on a monitoring capacitor thus connected by the scanning switch means causing the electron control device to remain in the said first condition.

5. Apparatus according to claim 4 further characterized by the provision of an electrically-controlled master switch means having first and second operative states and connected in a circuit for control by said electron control device to be actuated in the first of its said operated states while the electron control device is in its said first condition, and such that the master switch will be actuated in its said second operative state responsive to change of the electron control device to the second of its said operative conditions; a hold-in circuit means connecting with said master switch means to prevent the latter from changing immediately from its first to its second operative states, when the electron control device changes from first to second operative conditions for an interval of time substantially equal to the time elapsing between changes of connection of the monitoring switch means from one said capacitor to the next succeeding one; each said cycle of the monitoring switch means having a time duration in relation to the number of said capacitors connected in each cycle such that each capacitor is connected to said supervisory control device twice during a guard time interval which is not less than a predetermined minimum number of seconds and not greater than a different predetermined maximum number of seconds.

6. In a flame supervisory circuit, an electron control device having an *on* and *off* conductive state and an input circuit including a control electrode adapted to have an operating potential applied thereto to actuate the device to an *on* state, said device further having an electrode in said output circuit adapted to have an operating potential applied thereto to maintain the device in said *on* state; a first relay having an energizing winding in said output circuit energized by the latter in said *on* state; a rotary scanning switch including a rotary contact, a motor driving said contact through successive scanning cycles, a plurality of monitoring contacts each engaged in succession by said rotary contact in each cycle; a like plurality of monitoring capacitors each connected to be charged by flame conduction at a corresponding flame to be monitored to a predetermined signalling charge, and each connecting with one of said monitoring contacts; said rotary contact being operative to connect each one of said capacitors in succession to said control electrode in each said cycle and said signalling charge when present on any such connected capacitor affecting said electrode to actuate the control device to said *on* state; said relay having a first contact means in said output circuit effective in the *on* state to interrupt said output potential and restore said control device to said *off* state; and a supervisory relay having an operating winding controlled by said first-mentioned relay and adapted to control a master supervisory circuit; together with a motor-energizing circuit controlled by said supervisory relay in a certain condition of the latter to continue the motor in operation so long as said control device is continuously successively actuated to the *on* and *off* states of operation by said signalling charges at each monitoring contact, said motor-energizing circuit including a holding circuit means cooperable with said supervisory relay to maintain the same in said certain condition only during the interval required for said rotary contact to travel from one monitoring contact to the next.

7. In a monitoring system, a plurality of functional devices to be monitored, means controlled by operation of said devices providing a D.C. signalling potential only so long as said devices are operating in a predetermined required manner; a monitoring capacitor for each said device and connected therewith to be charged by the corresponding said signalling potential; scanning switch means including a monitoring contact connected with each said monitoring capacitor and a scanning contactor movable in scanning cycles and operable to engage each monitoring contact in succession in each said cycle to complete a momentary test circuit with each said capacitor for the purpose of testing each appertaining functional device during each such scanning cycle; a supervisory electron control device having first and second operating conditions and adapted to be actuated from one said condition to the other by means of a triggering potential of predetermined minimum value applied thereto from any of said monitoring capacitors; circuit means connecting said scanning switch means with said supervisory control device to apply in succession thereto the existing charge on each said monitoring capacitor by scanning operation thereof whereby to actuate the supervisory control device in rapid sequence from the first condition to the second condition; means actuated by the supervisory control device in the second condition thereof for automatically restoring the switch to said first condition; an electrically-controlled master switch means connected with said supervisory control device to be actuated by the latter in a particular condition provided said supervisory control device is operated in its said first condition, and to be operated in a different condition provided the supervisory control device is operated in its said second operative condition; and a holding circuit means connecting with said master switch means and operative to maintain the latter in said particular operative condition for a predetermined minimum time notwithstanding failure of operation of the supervisory control device in the second of its operative conditions during said minimum time, whereby the change of operative condition of the supervisory control device from first to second condition must persist for the time before the master switch means will change from its said particular to its different operative condition.

8. In a flame monitoring apparatus for use with a plurality of sources of flame-supervisory electrical signals, means for separately storing signals from each said source; an electron-flow control device having an input circuit connected to be actuated by said signals, and an output circuit having *on* and *off* current-flow conditions, the *on* condition being triggered under control of said input circuit in actuated condition, and the *off* condition being effected by interrupting current flow in said output circuit; a first relay having a winding connected to be energized by said output circuit; a second relay having a winding connected to be energized by contact means controlled by the first relay; and a scanning switch including monitoring contact means each connected with one of said signal-storing means, and a movable scanning contactor travelling in scanning cycles to engage each said monitoring contact means in succession in each cycle at a substantially uniform scanning rate, and to complete a circuit between each monitoring contact means engaged and said input circuit to trigger the latter provided the stored charge amounts to not less than a certain signal value; and contact means controlled by the second relay responsive to said *on* condition in the output circuit for interrupting current flow in the latter to effect the *off* condition therein.

9. In a flame monitoring system, means providing a plurality of distinct sources of flame-controlled charging potential; a monitoring capacitor connected with each said source to be charged to a predetermined minimum signalling potential thereby; a supervisory electron-flow device having a controlling electrode and a controlled electrode; a sensing relay in circuit with the controlled electrode for actuation from a first to a second condition responsive to existence of corresponding first and second conditions of operation of said controlled electrode; circuit means connecting with the control electrode determining a first mode of operation of the electron-flow device which will maintain the controlled electrode in said first condition; and a monitoring switch operative in scanning cycles to connect each one of said monitoring capacitors individually in succession with said control electrode once per scanning cycle for actuation of the electron-flow device by each capacitor to change its operating mode from the first to the second condition provided said predetermined minimum charge exists on such capacitor, whereby to cause the controlled electrode to actuate said relay to the second condition; and circuit means controlled by said relay in the second operative condition of the latter for affecting the electrical condition of the controlled electrode to restore the latter to said first operative condition thereof.

10. In a flame supervisory system, a scanning switch comprising a member providing a fluid sump having an opening communicating into a well having an inside vertical cyclindrical wall; a plurality of stationary contacts spaced apart uniformly about said wall with contactable face portions exposed flush with the inside periphery of said wall for engagement by a rotary contactor; said contacts each having a connection portion exposed exteriorly of the sump; a closure for the well; a motor carried by said closure having a drive shaft driven by said motor and extending into the well and also having a salient portion; an indicia wheel carried by the salient portion of said shaft and having spaced indicia thereabout sequentially designating each said contact for angular alignment with the latter as the shaft rotates; and a scanning contactor means fixed on said shaft to rotate in the well with a contact portion engaging the periphery of said wall and the exposed faces of said stationary contacts, said well being adapted to contain a lubricating fluid electrically compatible with contacting engagement of the scanning contactor with said stationary contacts.

References Cited by the Examiner

UNITED STATES PATENTS

| | | | |
|---|---|---|---|
| 2,360,532 | 10/1944 | Yates | 328—6 |
| 2,431,158 | 11/1947 | Yates | 328—6 |
| 2,786,988 | 3/1957 | Bergman | 340—213 |
| 3,205,486 | 9/1965 | Crowley | 340—213 |

ORIS L. RADER, *Primary Examiner.*

W. SHOOP, *Assistant Examiner.*